United States Patent
Zhou et al.

(10) Patent No.: US 8,073,389 B2
(45) Date of Patent: Dec. 6, 2011

(54) DUAL-MODE MOBILE COMMUNICATION DEVICE CAPABLE OF SHARING BLUETOOTH MODULE TO PERFORM COMMUNICATION

(75) Inventors: Ji-Hua Zhou, Nanjing (CN); Qing-Xin Xu, Nanjing (CN); Yu-Le Zhu, Nanjing (CN)

(73) Assignee: Inventec Appliances Corp., Taipei Hsien (TW)

( * ) Notice: Subject to any disclaimer, the term of this patent is extended or adjusted under 35 U.S.C. 154(b) by 486 days.

(21) Appl. No.: 12/325,140

(22) Filed: Nov. 29, 2008

(65) Prior Publication Data

US 2010/0136907 A1    Jun. 3, 2010

(51) Int. Cl.
*H04B 7/00* (2006.01)

(52) U.S. Cl. .................. 455/41.2; 455/83; 455/552.1

(58) Field of Classification Search .................. 455/41.2, 455/83, 552.1
See application file for complete search history.

(56) References Cited

U.S. PATENT DOCUMENTS 7,269,183 B2 *    9/2007    Morris .................. 370/466
* cited by examiner

*Primary Examiner* — Lincoln Donovan
*Assistant Examiner* — John Poos
(74) *Attorney, Agent, or Firm* — CKC & Partners Co., Ltd.

(57) ABSTRACT

A dual-mode mobile communication device capable of sharing Bluetooth module to perform communication is disclosed. The dual-mode mobile communication device includes a first communication module, a second communication module and a Bluetooth module. The Bluetooth module of the dual-mode mobile communication device is electrically connected with a Bluetooth device. The first communication module is electrically connected with the second communication module and the Bluetooth module respectively.

16 Claims, 7 Drawing Sheets

DUAL-MODE MOBILE COMMUNICATION DEVICE CAPABLE OF SHARING BLUETOOTH MODULE TO PERFORM COMMUNICATION

BACKGROUND

1. Field of Invention

The present invention relates to a dual-mode mobile communication device. More particularly, the present invention relates to a dual-mode mobile communication device capable of sharing a Bluetooth module for communication.

2. Description of Related Art

As the means of communication continue to increase, communication device with single communication system is inadequate to provide the functions of communication. The current common dual-mode mobile communications apparatuses are being substituted for the single-mode mobile communication apparatuses; the common dual-mode mobile communications apparatus can simultaneously send and receive communication signals of two different communication systems or two different frequency bands.

However, a conventional dual-mode mobile apparatus cannot make two different communication modules share a Bluetooth module for communication. In other words, only one communication module can use Bluetooth devices for the call, where only one communication module usually with primary mode of communication. Therefore, that may cause inconvenience in practical application for users.

For the foregoing reasons, there is a need for a new a dual-mode mobile communication device capable of sharing a Bluetooth module and thereby is wirelessly connected to the Bluetooth device for communication, so that it is convenient for people to use the dual-mode mobile communication device. The present disclosure meets this need.

SUMMARY

It is therefore an aspect of the present disclosure to provide a dual-mode mobile communication device capable of sharing Bluetooth module for communication.

In accordance with an embodiment of the present disclosure, the dual-mode mobile communication device comprises a first communication module, a second communication module and a Bluetooth module. The second communication module is electrically connected with the first communication module. The Bluetooth module is electrically connected with the first communication module and wirelessly connected with a Bluetooth device.

It is to be understood that both the foregoing general description and the following detailed description are by examples, and are intended to provide further explanation of the invention as claimed.

BRIEF DESCRIPTION OF THE DRAWINGS

For a more complete understanding of the present invention, and the advantages thereof, reference is now made to the following descriptions taken in conjunction with the accompanying drawing, in which.

DESCRIPTION OF THE PREFERRED EMBODIMENTS

Figure 1:
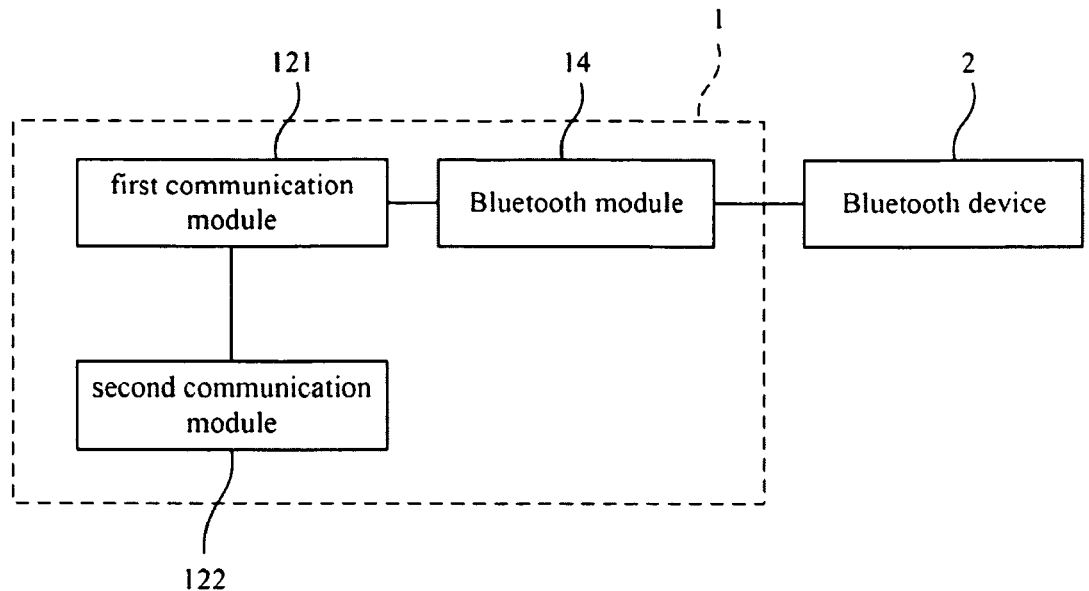
FIG. 1 is a schematic diagram of a dual-mode mobile communication device capable of sharing Bluetooth module for communication in accordance with the first embodiment of the present disclosure.

Reference will now be made in detail to the present preferred embodiments of the invention, examples of which are illustrated in the accompanying drawings. Wherever possible, the same reference numbers are used in the drawings and the description to refer to the same or like parts.

A first embodiment of the present disclosure is a dual-mode mobile communication device capable of sharing a Bluetooth module for communication. The dual-mode mobile communication device is discussed below with reference to FIG. 1 to FIG. 8.

Please refer to FIG. 1. FIG. 1 is a schematic diagram of the dual-mode mobile communication device in accordance with the first embodiment of the present disclosure. The dual-mode mobile communication device 1 is electrically connected with a Bluetooth device 2. The dual-mode mobile communication device 1 comprises a first communication module 121, a second communication module 122 and a Bluetooth module 14. The Bluetooth module 14 is electrically connected with the Bluetooth device 2. The first communication module 121 is electrically connected with the second communication module 122 and the Bluetooth module 14. The first communication module 121 and the second communication module 122 are different communication systems or different frequency bands.

Accordingly, the first communication module 121 is directly electrically connected to the Bluetooth module 14 and thereby uses the Bluetooth device 2 for communication. Alternatively, the second communication module 122 is indirectly electrically connected to the Bluetooth module 14 through the first communication module 121. Thus, the purpose of the first communication module 121 and the second communication module 122 of the dual-mode mobile communication device 1 sharing the Bluetooth module 2 to communicate can be achieved.

When the first communication module 121 is the primary communication module, the second communication module 122 is the secondary communication module. On the contrary, when the first communication module 121 is the secondary communication module, the second communication module 122 is the primary communication module. The first communication module 121 and the second communication module 122 may each comply with a system selected from the group consisting of Global System for Mobile Communications (GSM), Personal Handy-phone System (PHS), Code Division Multiple Access (CDMA) and TD-SCDMA. The first communication module 121 and the second communication module 122 are different. For example, the first communication module 121 may be GSM and the second communication module 122 may be PHS. Alternatively, the first communication module 121 and the second communication module 122 are different frequency bands. For example, the first communication module 121 may comply with GSM 900 and the second communication module 122 may comply with GSM 1800.

Figure 2:
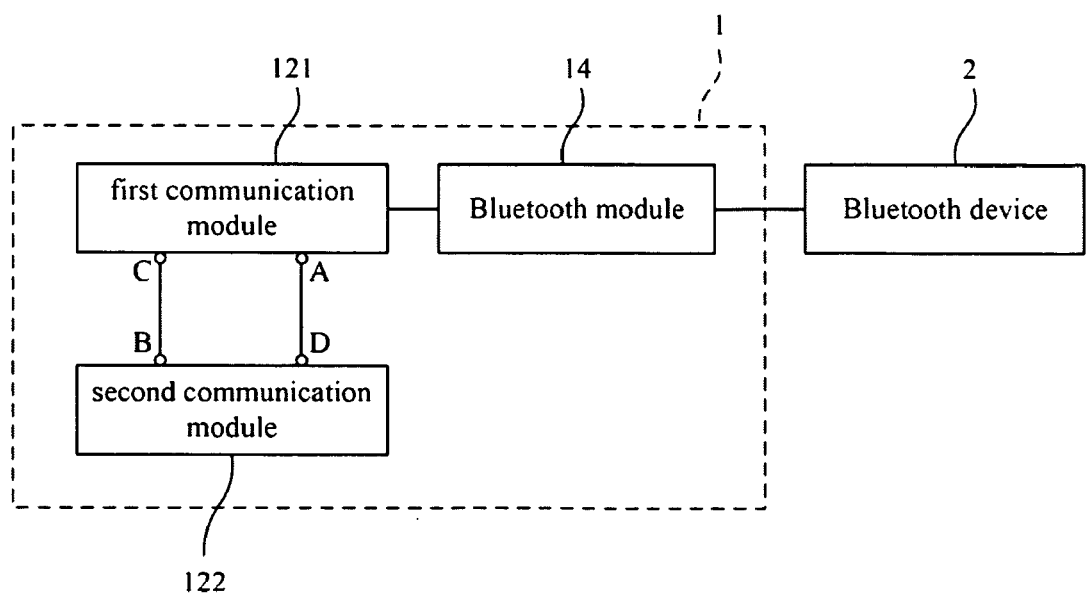
FIG. 2 is another schematic diagram of the dual-mode mobile communication device in accordance with the first embodiment of the present disclosure.

Please refer to FIG. 2. In FIG. 2, the first communication module 121 has an audio input terminal A and an audio output terminal C; the second communication module 122 has an audio input terminal B and an audio output terminal D. The audio input terminal A of the first communication module 121 is electrically connected with the audio output terminal D of the second communication module 122; the audio output terminal C of the first communication module 121 is electrically connected with the audio input terminal B of the second communication module 122. Therefore, when the first communication module 121 is operated, the communication signal of the first communication module 121 through the pulse-code modulation interface that is between the first communication module 121 and the Bluetooth module 14 is transmitted to the Bluetooth device 2, so that the first communication module 121 can use the Bluetooth device 2.

When the second communication module 122 is operated, the first communication module 121 acts as a gateway set between the second communication module 122 and the Bluetooth module 14. In other words, the second communication module 122 transmits the communication signal to the audio input terminal A of the first communication module 121 by means of the audio output terminal D, and then the communication signal through the pulse-code modulation interface that is between the first communication module 121 and the Bluetooth module 14 is transmitted to the Bluetooth device 2, so that the second communication module 122 can use the Bluetooth device 2. The Bluetooth device 2 outputs the communication signal that transmits to the first communication module 121 through the Bluetooth module 14, and then the communication signal is transmitted to the audio input terminal B of the second communication module 122 by means of the audio output terminal C of the first communication module 121, so that the communication signal of the operating second communication module 122 is indirectly transmitted to the Bluetooth module 14 through the first communication module 121, and then the communication signal is transmitted to the Bluetooth device 2. Alternatively, the operating second communication module 122 indirectly receives the communication signal from the Bluetooth device 2 to the Bluetooth module 14.

Figure 3:
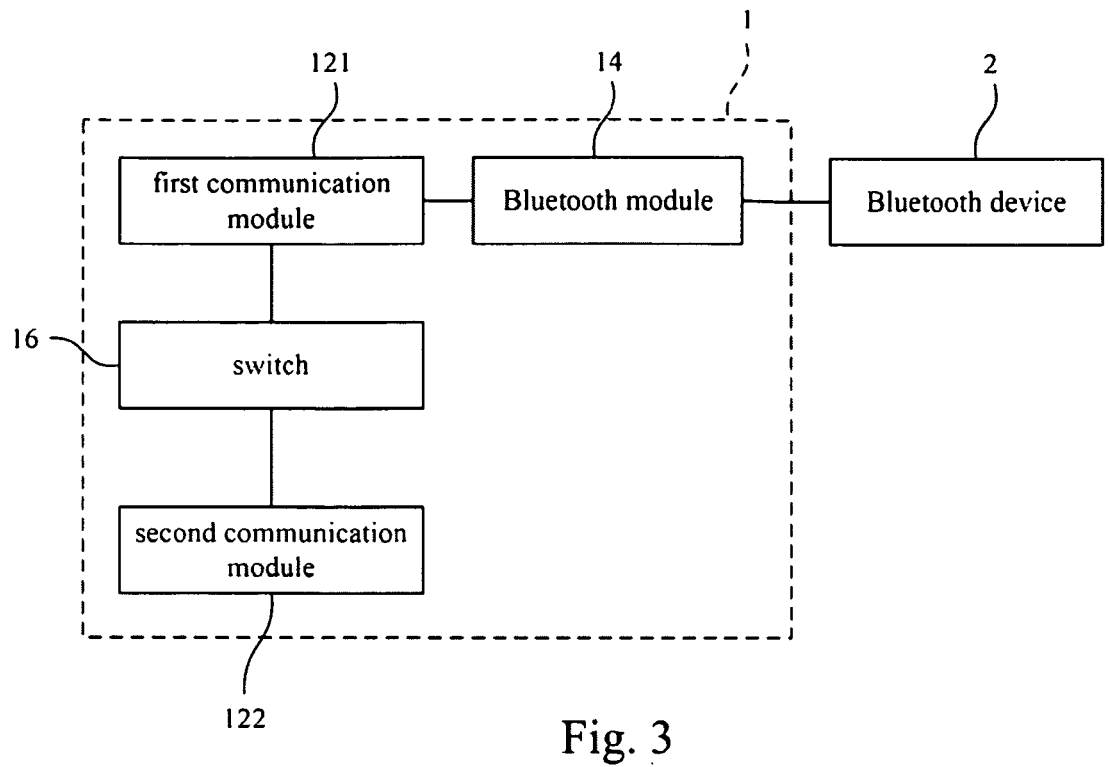
FIG. 3 is a schematic diagram of the dual-mode mobile communication device having a switch that is set between a first communication module 121 and a second communication module in accordance with the first embodiment of the present disclosure.

Please refer to FIG. 3. In FIG. 3, the dual-mode mobile communication device 1 further comprises at least one switch 16 set between the first communication module 121 and the second communication module 122. The switch 16 is electrically connected with the first communication module 121 and the second communication module 122. Therefore, the switch 16 could be turned on/off so as to operate whether the second communication module 122 is electrically connected to the first communication module 121. For example, the switch 16 is turned off when the first communication module 121 is operated, so that the second communication module 122 is not electrically connected to the first communication module 121. On the contrary, the switch 16 is turned on when the second communication module 122 is operated, so that the second communication module 122 is electrically connected to the first communication module 121, and then is indirectly electrically connected with the Bluetooth module 14 through the first communication module 121, so as to use the Bluetooth device 2.

Figure 4:
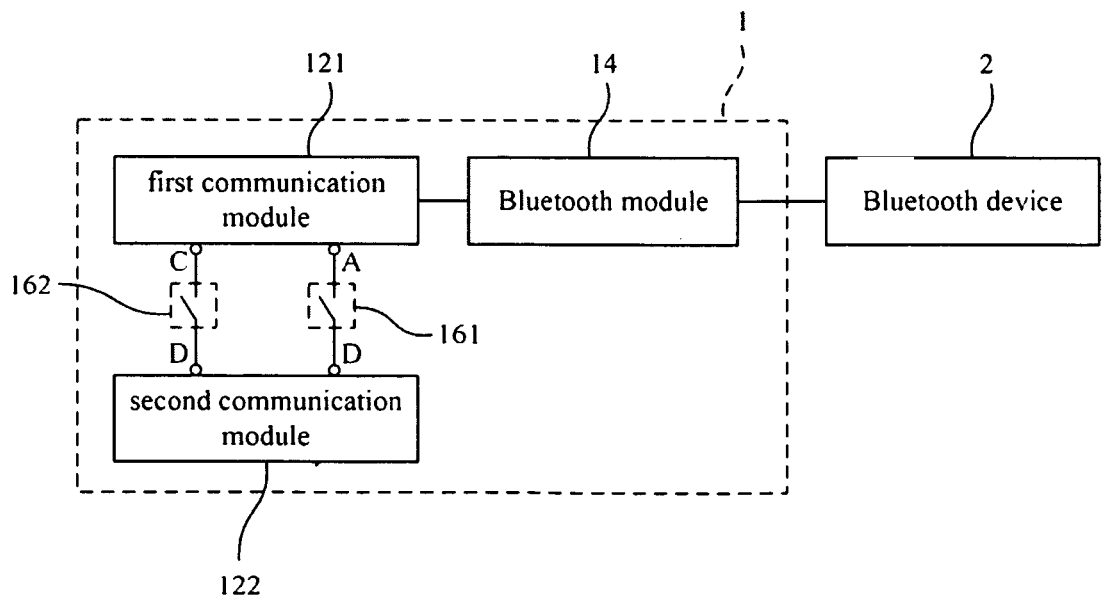
FIG. 4 is yet another schematic diagram of the dual-mode mobile communication device in accordance with the first embodiment of the present disclosure.

Please refer to FIG. 4. In FIG. 4, two switches 161 and 162 are set between the first communication module 121 and the second communication module 122, where one switch 161 is electrically connected with the audio input terminal A of the first communication module 121 and the audio output terminal D of the second communication module 122; the other switch 162 is electrically connected with the audio output terminal C of the first communication module 121 and the audio input terminal B of the second communication module 122, wherein the switches 161 and 162 are not turned on simultaneously. Therefore, the switch 161 or the switch 162 is turned on/off according to the operation of the first communication module 121 and the second communication module 122.

Figure 5:
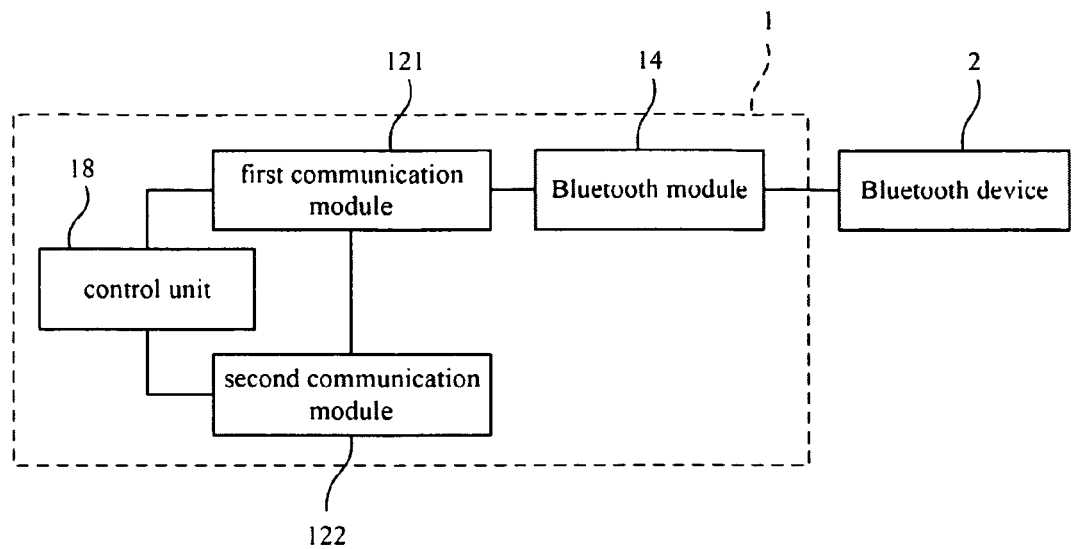
FIG. 5 is a schematic diagram of the dual-mode mobile communication device having a control unit that is electrically connected with the first communication module and the second communication module in accordance with the first embodiment of the present disclosure.

Please refer to FIG. 5. In FIG. 5, the dual-mode mobile communication device 1 further comprises a control unit 18. The control unit 18 can generate a control signal to control electrical relationship among the first communication module 121, the second communication module 122 and the Bluetooth module 14 when detecting the first communication module 121 is operated. The GPIO of the control unit 18 outputs the control signal. The control unit 18 may be an independent element of the dual-mode mobile communication device 1. In other words, the control unit 18 can start the corresponding communication module (i.e. the first communication module 121 or the second communication module 122) according to the mode of communication signal.

Figure 6:
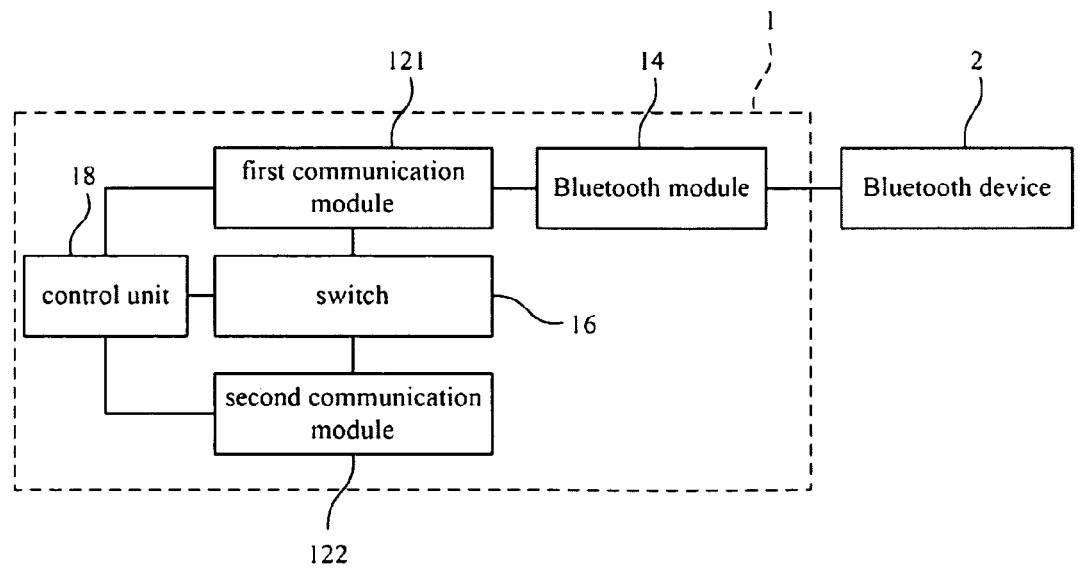
FIG. 6 is a schematic diagram of the dual-mode mobile communication device having the control unit that is electrically connected with the first communication module, the second communication module and the switch in accordance with the first embodiment of the present disclosure.

Please refer to FIG. 6. In FIG. 6, the control unit 18 is electrically connected with the first communication module 121, the second communication module 122 and the switch 16. It should be noted that the control unit 18 is electrically connected with the first communication module 121, the second communication module 122 and the switch 16 for illustrative purposes only: in the embodiment, the control unit 18 can be electrically connected with at least one of the first communication module 122, the second communication module 121 or the switch 16. The control unit 18 can directly start the corresponding communication module (i.e. the first communication module 121 or the second communication module 122) and close the other according to the mode of communication signal.

Figure 7:
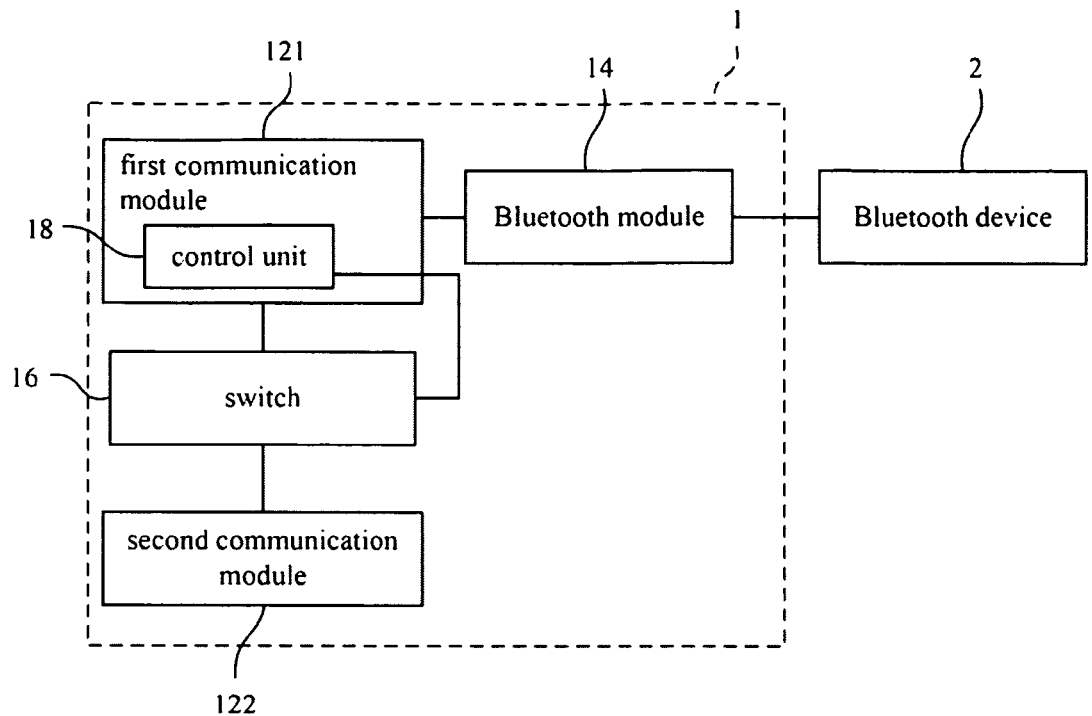
FIG. 7 is a schematic diagram of the control unit built in the first communication module in accordance with the first embodiment of the present disclosure.
Figure 8:
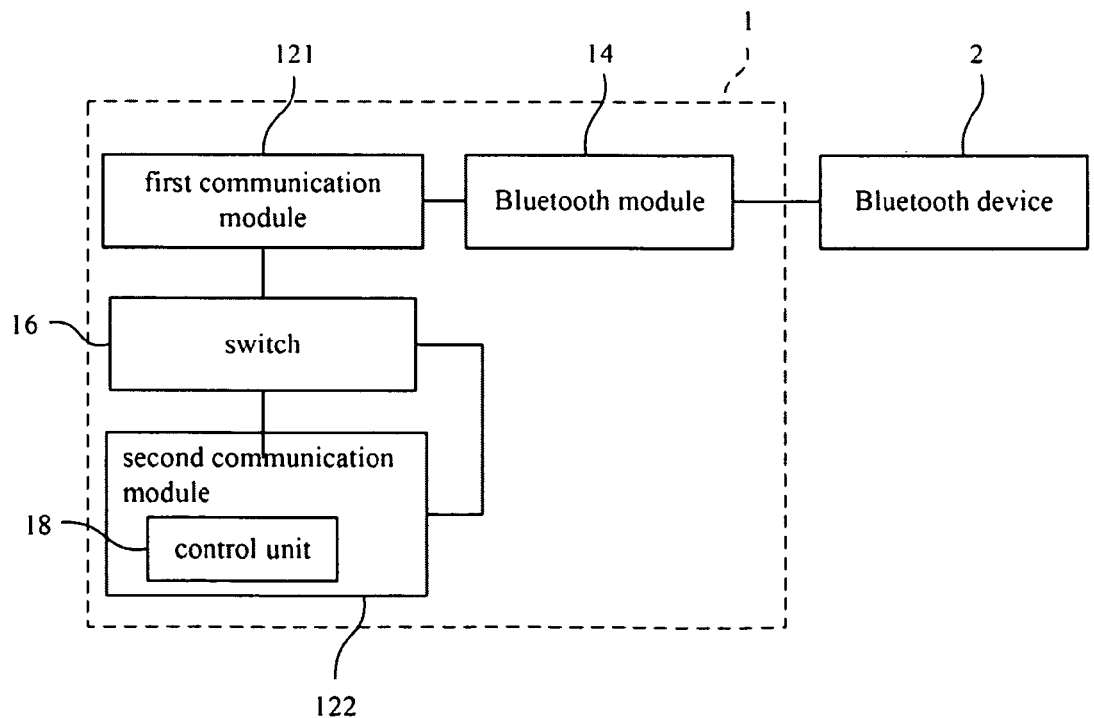
FIG. 8 is a schematic diagram of the control unit built in the second communication module in accordance with the first embodiment of the present disclosure.

Please refer to FIG. 7 and FIG. 8. In FIG. 7, the first communication module 121 comprises the control unit 18. In FIG. 8, the second communication module 122 comprises the control unit 18. In FIG. 7 and FIG. 8, the control unit 18 is electrically connected with the switch 16, and thus the control unit 18 outputs the control signal to turn on/off the switch 16. Alternatively, the processor of the first communication module 121 or the second communication module 122 can perform the function of the control unit 18.

Furthermore, the dual-mode mobile communication device is capable of sharing the Bluetooth module to perform communication. The dual modes in which the dual-mode mobile communication device can be operated may be GSM/CDMA, GSM/TD-SCDMA, GSM/WCDMA, GSM/CDMA2000, CDMA/PHS, CDMA/TD-SCDMA, CDMA/WCDMA, CDMA2000/TD-SCDMA, CDMA2000/WCDMA, WCDMA/TD-SCDMA, GSM 900/GSM 1800 or the like. The dual modes of the mobile communication device are capable of sharing the Bluetooth module, which is already disclosed in the above-mentioned embodiment and, thus, is not explained again.

Additionally, in the dual-mode mobile communication device sharing the Bluetooth module to perform communication, the Bluetooth module comprises a Bluetooth transceiver interface and base band interface. The Bluetooth device may be a Bluetooth earphone.

Accordingly, the dual-mode mobile communication device sharing the Bluetooth module to perform communication as discussed in the first embodiment, in which one communication module directly electrically connected with the Bluetooth module, and the other communication module indirectly electrically connected with the Bluetooth module. Therefore, the different communication modules of the dual-mode mobile communication device can use the same Bluetooth module to wirelessly connect to the Bluetooth device. In the first embodiment, two different communication modules can indeed play a dual mode of communication effectiveness, and share the same Bluetooth modules to strengthen the advantages of dual mode of communication.

A second embodiment of the present disclosure is a dual-mode mobile communication device capable of sharing Bluetooth module for communication. The dual-mode mobile communication device as discussed below with reference to FIG. 9, FIG. 10, FIG. 11, FIG. 12 and FIG. 13.

Figure 9:
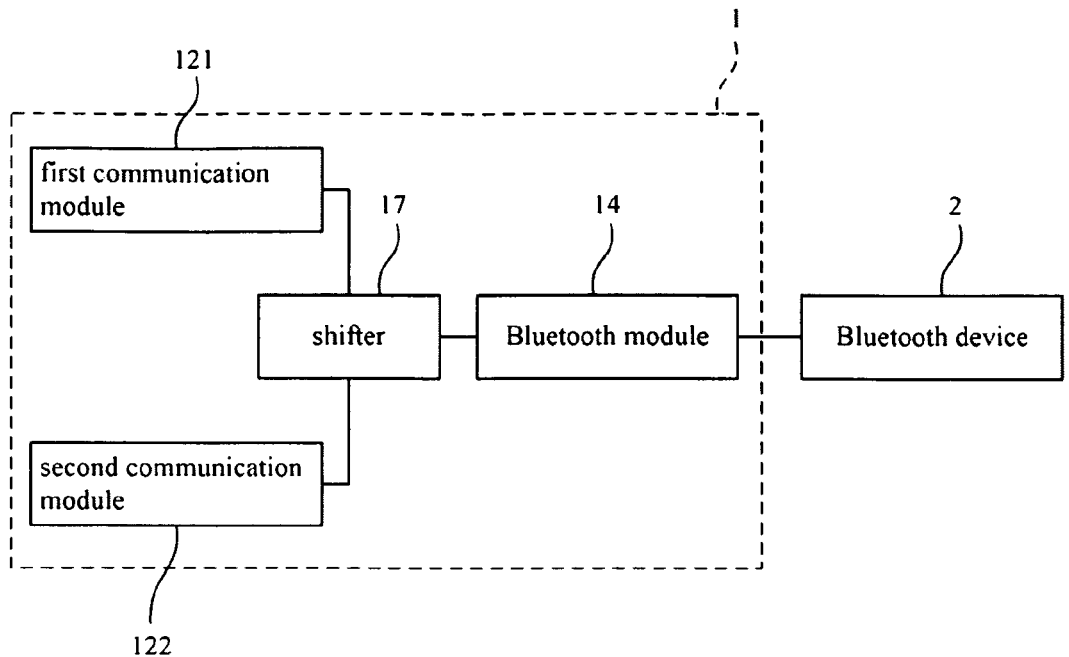
FIG. 9 is a schematic diagram of a dual-mode mobile communication device capable of sharing a Bluetooth module for communication in accordance with the second embodiment of the present disclosure.

Please refer to FIG. 9. FIG. 9 is a block diagram of the dual-mode mobile communication device in accordance with the second embodiment of the present disclosure. The dual-mode mobile communication device 1 is electrically connected with a Bluetooth device 2. The dual-mode mobile communication device 1 comprises a first communication module 121, a second communication module 122, a Bluetooth module 14 and a shifter 17. The Bluetooth module 14 is electrically connected with the Bluetooth device 2. The first communication module 121 is electrically connected with the second communication module 122 and the Bluetooth module 14. In the second embodiment, the first communication module 121 and/or the second communication module 122 is electrically connected with the Bluetooth module 14 through the shifter 17. The Bluetooth module 14 is wirelessly connected to the Bluetooth device 2.

The shifter 17 is electrically connected with the first communication module 121 and the second communication module 122. The shifter 17 is electrically connected with the Bluetooth module 14.

The first communication module 121 or the second communication module 122 is electrically connected with and the Bluetooth module 14 through the shifter 17. In other words, based upon experience, the first communication module 121 is electrically connected to the Bluetooth module 14 by means of the shifter 17, so as to use the Bluetooth device 2 for communication; alternatively, the second communication module 122 is electrically connected to the Bluetooth module 14 by means of the shifter 17, so as to use the Bluetooth device 2 for communication. Thus, the different communication systems, such as the first communication module 121 and the second communication module 122, of the dual-mode mobile communication device 1 are capable of sharing the Bluetooth module 2 to perform communication.

When the first communication module 121 is the primary communication module, the second communication module 122 is the secondary communication module. On the contrary, when the first communication module 121 is the secondary communication module, the second communication module 122 is the primary communication module. The first communication module 121 and the second communication module 122 may each comply with a system selected from the group consisting of Global System for Mobile Communications (GSM), Personal Handy-phone System (PHS), Code Division Multiple Access (CDMA) and TD-SCDMA. The first communication module. 121 and the second communication module 122 are different. For example, the first communication module 121 may be GSM and the second communication module 122 may be PHS. Alternatively, the first communication module 121 and the second communication module 122 are for operation in different frequency bands. For example, the first communication module 121 may comply with GSM 900 and the second communication module 122 may comply with GSM 1800.

The interface between the first communication module 121 and the Bluetooth module 14 may be a pulse-code modulation interface. The interface between the second communication module 122 and the Bluetooth module 14 may be a pulse-code modulation interface. The shifter 17 may be the Single Pole Double Throw (SPDT) switch and is used to enable the first communication module 121 or the second communication module 122 to switch to electrically connecting to the Bluetooth module 14.

Figure 10:
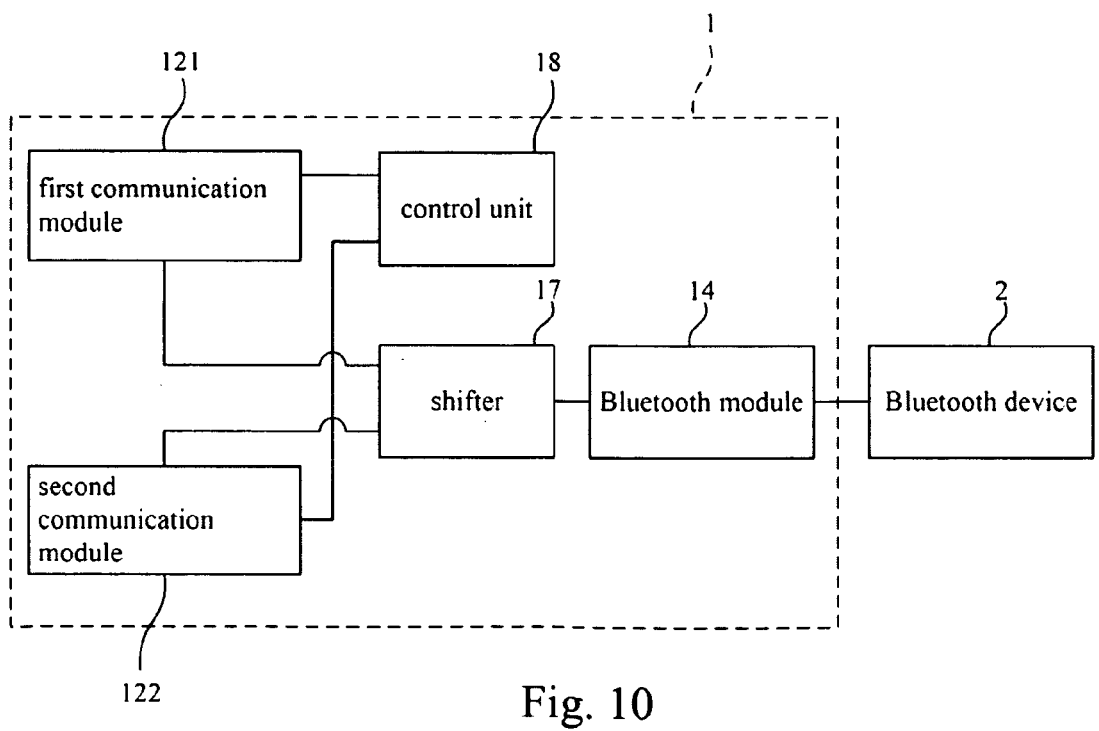
FIG. 10, FIG. 11 and FIG. 12 are schematic diagrams of a dual-mode mobile communication device having a control unit to operate the switch.

Please refer to FIG. 10. In FIG. 10, a control unit 18 can be used to control the switching of the shifter 17. The control unit 18 is electrically connected to the shifter 17. The control unit 18 may be an independent element of the dual-mode mobile communication device 1. When the control unit 18 detects the first communication module 121 is operated, the control unit 18 can generate a control signal to control that the shifter 17 electrically connects the first communication module 121 and the Bluetooth module 14, thereby the first communication module 121 can use the Bluetooth device 2 for communication. On the contrary, when the control unit 18 detects the second communication module 122 is operated, the control unit 18 can generate a control signal to control that the shifter 17 electrically connects the second communication module 122 and the Bluetooth module 14, thereby the second communication module 122 can use the Bluetooth device 2 for communication. The GPIO of the control unit 18 can transmit the control signal to the shifter 17.

Figure 11:
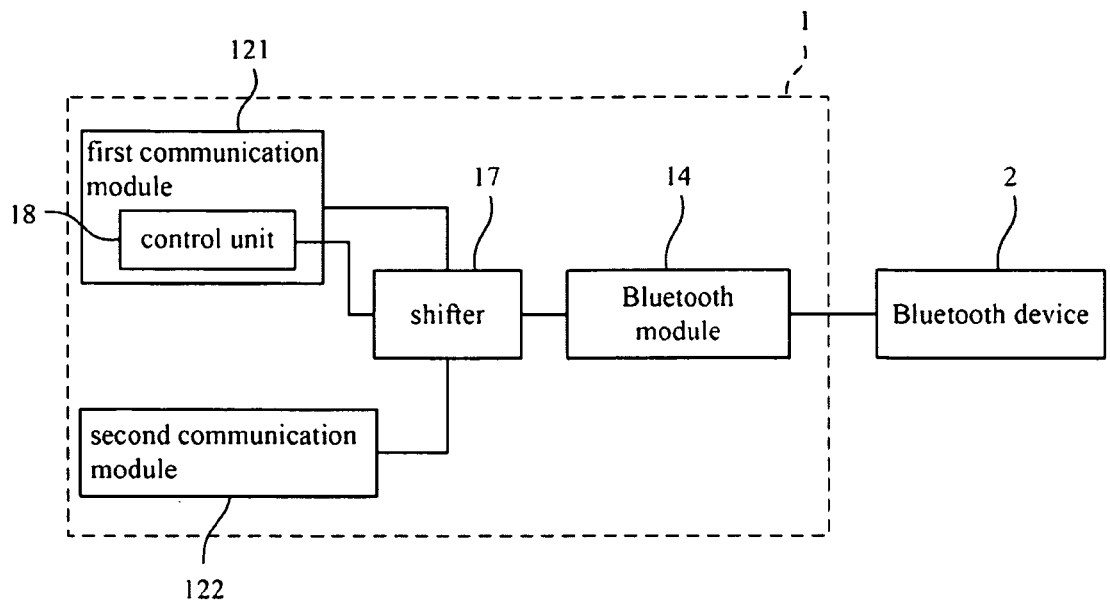
Figure 12:
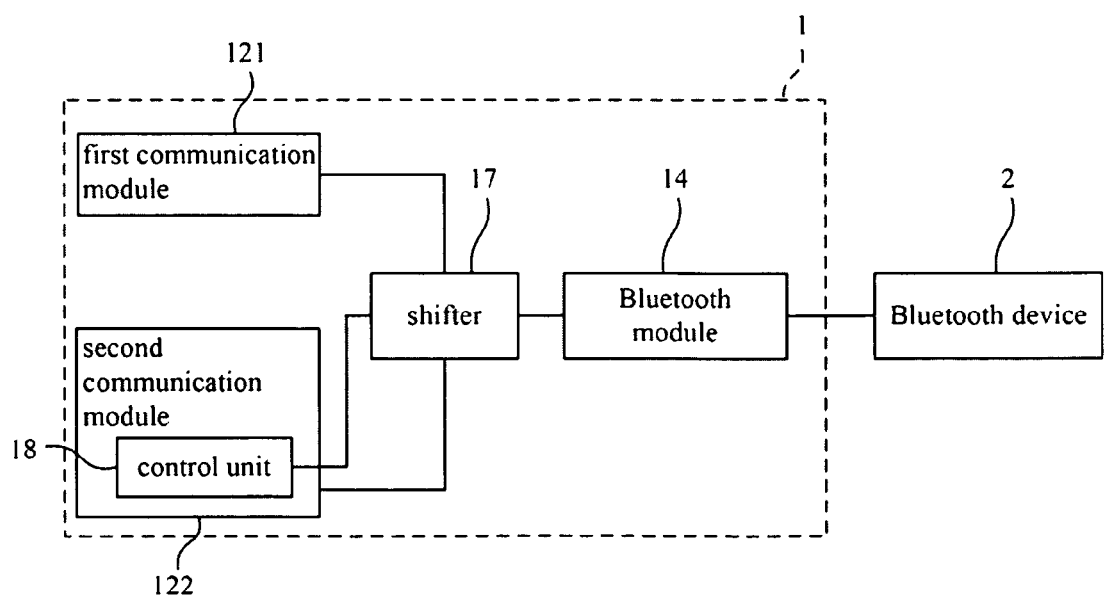

Please refer to FIG. 11 and FIG. 12. In FIG. 11, the first communication module 121 comprises the control unit 18. In FIG. 12, the second communication module 122 comprises the control unit 18. In FIG. 7 and FIG. 8, the control unit 18 is electrically connected with the shifter 17, and thus the control unit 18 outputs the control signal to operate the shifter 17. Alternatively, the processor of the first communication module 121 or the second communication module 122 can perform the function of the control unit 18.

In the above-mentioned dual-mode mobile communication device sharing the Bluetooth module to perform communication, the Bluetooth module comprises a Bluetooth transceiver interface and a baseband interface. The Bluetooth device may be a Bluetooth earphone.

For a more complete understanding of the present disclosure, and the advantages thereof, one aspect of the present disclosure is a dual-mode mobile communication device with GSM/PHS modules sharing a common Bluetooth earphone for communication. The dual-mode mobile communication device as discussed below with reference to FIG. 13, which is provided for illustrative purposes only to further explain applications of the present invention and are not meant to limit the present invention in any manner.

Figure 13:
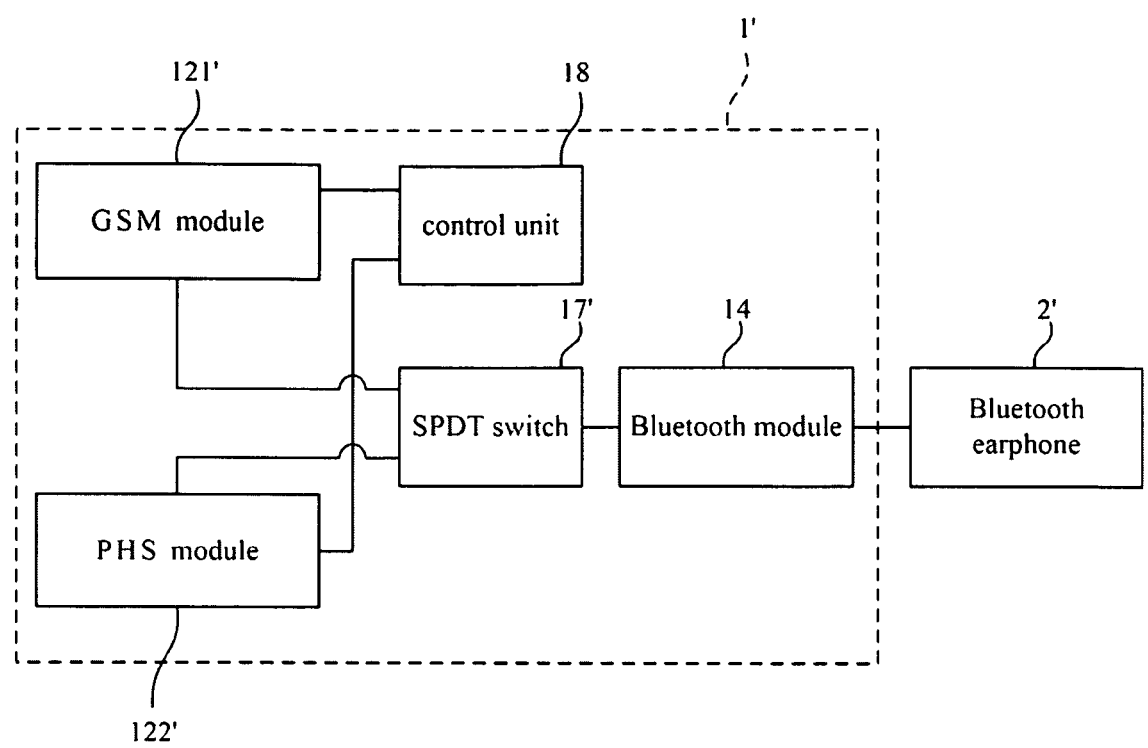
FIG. 13 is a schematic diagram of a GSM/PHS dual-mode mobile communication device.

Please refer to FIG. 13. In FIG. 13, the GSM/PHS dual-mode mobile communication device 1' is capable of sharing the Bluetooth module to perform communication. The GSM/PHS dual-mode mobile communication device 1' comprises a GSM communication module 121', a PHS communication module 122', a SPDT switch 17' and a Bluetooth module 14. After the GSM/PHS dual-mode mobile communication device 1' received a GSM communication signal, the control unit 18 transmits a control signal from GPIO to the SPDT switch 17', so that the SPDT switch 17' electrically connects the GSM communication module 121' and the Bluetooth module 14. Therefore, the pulse-code modulation interface of the GSM communication module 121' is electrically connected to the pulse-code modulation interface of the Bluetooth module 14, in the meantime, the pulse-code modulation interface of the PHS communication module 122' is not electrically connected to the pulse-code modulation interface of the Bluetooth module 14. Thus, the Bluetooth earphone 2' wirelessly connected to the GSM/PHS dual-mode mobile communication device 1' can receive a voice signal from the GSM communication module 121'.

On the contrary, after the GSM/PHS dual-mode mobile communication device 1' received a PHS communication signal, the control unit 18 transmits a control signal from GPIO to the SPDT switch 17', so that the SPDT switch 17' electrically connects the PHS communication module 122' and the Bluetooth module 14. Therefore, the pulse-code modulation interface of the PHS communication module 122' is electrically connected to the pulse-code modulation interface of the Bluetooth module 14, in the meantime, the pulse-code modulation interface of the GSM communication module 121' is not electrically connected to the pulse-code modulation interface of the Bluetooth module 14.

Furthermore, the dual-mode mobile communication device is capable of sharing the Bluetooth module to perform communication. The dual modes in which the dual-mode mobile communication device can be operated may be GSM/CDMA, GSM/TD-SCDMA, GSM/WCDMA, GSM/CDMA2000, CDMA/PHS, CDMA/TD-SCDMA, CDMA/WCDMA, CDMA2000/TD-SCDMA, CDMA2000/WCDMA, WCDMA/TD-SCDMA, GSM 900/GSM 1800 or the like. The dual modes of the mobile communication device are capable of sharing the Bluetooth module, which is already disclosed in the above-mentioned embodiment and, thus, is not explained again.

Accordingly, the dual-mode mobile communication device as discussed in the second embodiment is enabled to have different communication modules which share the same Bluetooth module for wirelessly connecting to the is Bluetooth device. And this feature can improve significantly the shortcoming that a conventional dual-mode mobile apparatus can provide only one communication module for using the Bluetooth device to perform communication so that it is uncomfortable for people to use the conventional dual-mode mobile communication device. Thus, the dual-mode mobile communication device can indeed effectively make use of dual mode communication, and the dual modes can share the same Bluetooth modules to strengthen the advantages of the dual-mode communication.

It will be apparent to those skilled in the art that various modifications and variations can be made to the structure of the present invention without departing from the scope or spirit of the invention. In view of the foregoing, it is intended that the present invention cover modifications and variations of this invention provided they fall within the scope of the following claims and their equivalents.

What is claimed is:

1. A dual-mode mobile communication device, comprising:
   a first communication module:
   a second communication module electrically connected with the first communication module; and
   a Bluetooth module electrically connected with the first communication module and wirelessly connected with a Bluetooth device;
   at least one switch electrically connected with the first communication module and the second communication module, wherein the first communication module comprises:
   a control unit electrically connected with said at least one switch.

2. The dual-mode mobile communication device as claimed in claim 1, wherein the control unit outputs a control signal to turn on/off said at least one switch.

3. A dual-mode mobile communication device, comprising:
   a first communication module;
   a second communication module electrically connected with the first communication module; and
   a Bluetooth module electrically connected with the first communication module and wirelessly connected with a Bluetooth device;
   at least one switch electrically connected with the first communication module and the second communication module, wherein the second communication module comprises:
   a control unit electrically connected with said at least one switch.

4. The dual-mode mobile communication device as claimed in claim 3, wherein the control unit outputs a control signal to turn on/off said at least one switch.

5. The dual-mode mobile communication device as claimed in claim 3, wherein the first communication module has an audio input terminal and an audio output terminal, and the second communication module has an audio input terminal and an audio output terminal.

6. The dual-mode mobile communication device as claimed in claim 3, wherein the audio input terminal of the first communication module is electrically connected with the audio output terminal of the second communication module, and the audio output terminal of the first communication module is electrically connected with the audio input terminal of the second communication module.

7. The dual-mode mobile communication device as claimed in claim 6, wherein said at least one switch comprises two switches, wherein the audio input terminal of the first communication module is electrically connected with the audio output terminal of the second communication module through one of the two switches, and the audio output terminal of the first communication module is electrically connected with the audio input terminal of the second communication module through the other of the two switches.

8. The dual-mode mobile communication device as claimed in claim 7, wherein the two switches are not turned on simultaneously.

9. A dual-mode mobile communication device, comprising:
   a first communication module;

a second communication module electrically connected with the first communication module;

a Bluetooth module electrically connected with the first communication module and wirelessly connected with a Bluetooth device; and a shifter, wherein the first communication module or the second communication module is electrically connected with the Bluetooth module through the shifter.

10. The dual-mode mobile communication device as claimed in claim 9, further comprising:

a control unit electrically connected with the shifter.

11. The dual-mode mobile communication device as claimed in claim 10, wherein the control unit outputs a control signal to operate the shifter.

12. The dual-mode mobile communication device as claimed in claim 9, wherein the first communication module comprises:

a control unit electrically connected with the shifter.

13. The dual-mode mobile communication device as claimed in claim 12, wherein the control unit outputs a control signal to operate the shifter.

14. The dual-mode mobile communication device as claimed in claim 9, wherein the second communication module comprises:

a control unit electrically connected with the shifter.

15. The dual-mode mobile communication device as claimed in claim 14, wherein the control unit outputs a control signal to operate the shifter.

16. The dual-mode mobile communication device as claimed in claim 9, wherein the shifter comprises a Single Pole Double Throw (SPDT) switch.

* * * * *